(12) United States Patent
Hirota et al.

(10) Patent No.: US 8,765,038 B2
(45) Date of Patent: Jul. 1, 2014

(54) METHOD OF FEEDING COMPOSITE MOLTEN RESIN AND APPARATUS FOR FEEDING THE SAME

(75) Inventors: Norihisa Hirota, Yokohama (JP); Kazunobu Watanabe, Yokohama (JP); Yutaka Asano, Yokohama (JP); Jotaro Nagao, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 461 days.

(21) Appl. No.: 12/298,064

(22) PCT Filed: Mar. 15, 2007

(86) PCT No.: PCT/JP2007/055932
§ 371 (c)(1),
(2), (4) Date: Oct. 22, 2008

(87) PCT Pub. No.: WO2007/125701
PCT Pub. Date: Nov. 8, 2007

(65) Prior Publication Data
US 2009/0096129 A1    Apr. 16, 2009

(30) Foreign Application Priority Data
Apr. 27, 2006 (JP) ................. 2006-122809

(51) Int. Cl.
*B29C 47/06* (2006.01)
*B29C 47/30* (2006.01)
*B29C 47/20* (2006.01)

(52) U.S. Cl.
USPC . 264/151; 264/167; 264/173.11; 264/173.12; 264/210.2

(58) Field of Classification Search
USPC ................. 264/148, 150, 151, 514, 515, 539, 264/173.12, 173.16, 323, 167, 173.11, 264/210.2; 425/132, 133.1
See application file for complete search history.

(56) References Cited

U.S. PATENT DOCUMENTS

| | | | |
|---|---|---|---|
| 4,838,778 A * | 6/1989 | Becker et al. | 425/133.1 |
| 5,104,305 A | 4/1992 | Kawaguchi et al. | |
| 5,162,121 A | 11/1992 | Kawaguchi et al. | |
| 5,403,529 A * | 4/1995 | Kawaguchi | 264/167 |

(Continued)

FOREIGN PATENT DOCUMENTS

| | | |
|---|---|---|
| JP | 06-015715 A | 1/1994 |
| JP | 06-099471 A | 4/1994 |

(Continued)

*Primary Examiner* — Atul P. Khare
(74) *Attorney, Agent, or Firm* — Sughrue Mion, PLLC

(57) ABSTRACT

A method of feeding a composite molten resin capable of easily forming a multi-kind-multi-layer preform. An apparatus for feeding the composite molten resin has a nozzle portion which includes an outer discharge port in which an outermost annular flow path through which a main layer-forming molten resin flows, meets an outer annular flow path through which a sub-layer-forming molten resin flows inside of the outermost annular flow path; and an inner discharge port in which a shell layer-forming molten resin annularly flowing inside of the outer conflux path, meets the core layer-forming molten resin flowing inside the shell layer; the outer discharge port and the inner discharge port being arranged in this order from the downstream toward the upstream in a direction in which the molten resins flow; wherein provision is made of a shaft-like opening/closing valve for opening and closing the inner discharge port, and a gear pump for intermittently discharging the sub-layer-forming molten resin.

10 Claims, 8 Drawing Sheets

(56) References Cited

U.S. PATENT DOCUMENTS

| | | |
|---|---|---|
| 7,341,684 B2 | 3/2008 | Imatani et al. |
| 2004/0091652 A1* | 5/2004 | Kikuchi et al. ............. 428/35.7 |
| 2006/0051444 A1* | 3/2006 | Imatani et al. ............. 425/133.1 |
| 2007/0122578 A1* | 5/2007 | Watanabe et al. ............ 428/35.7 |

FOREIGN PATENT DOCUMENTS

| | | |
|---|---|---|
| JP | 06-049318 B2 | 6/1994 |
| WO | 2004/065101 A1 | 8/2004 |
| WO | WO 2005039855 A1 * | 5/2005 |

* cited by examiner

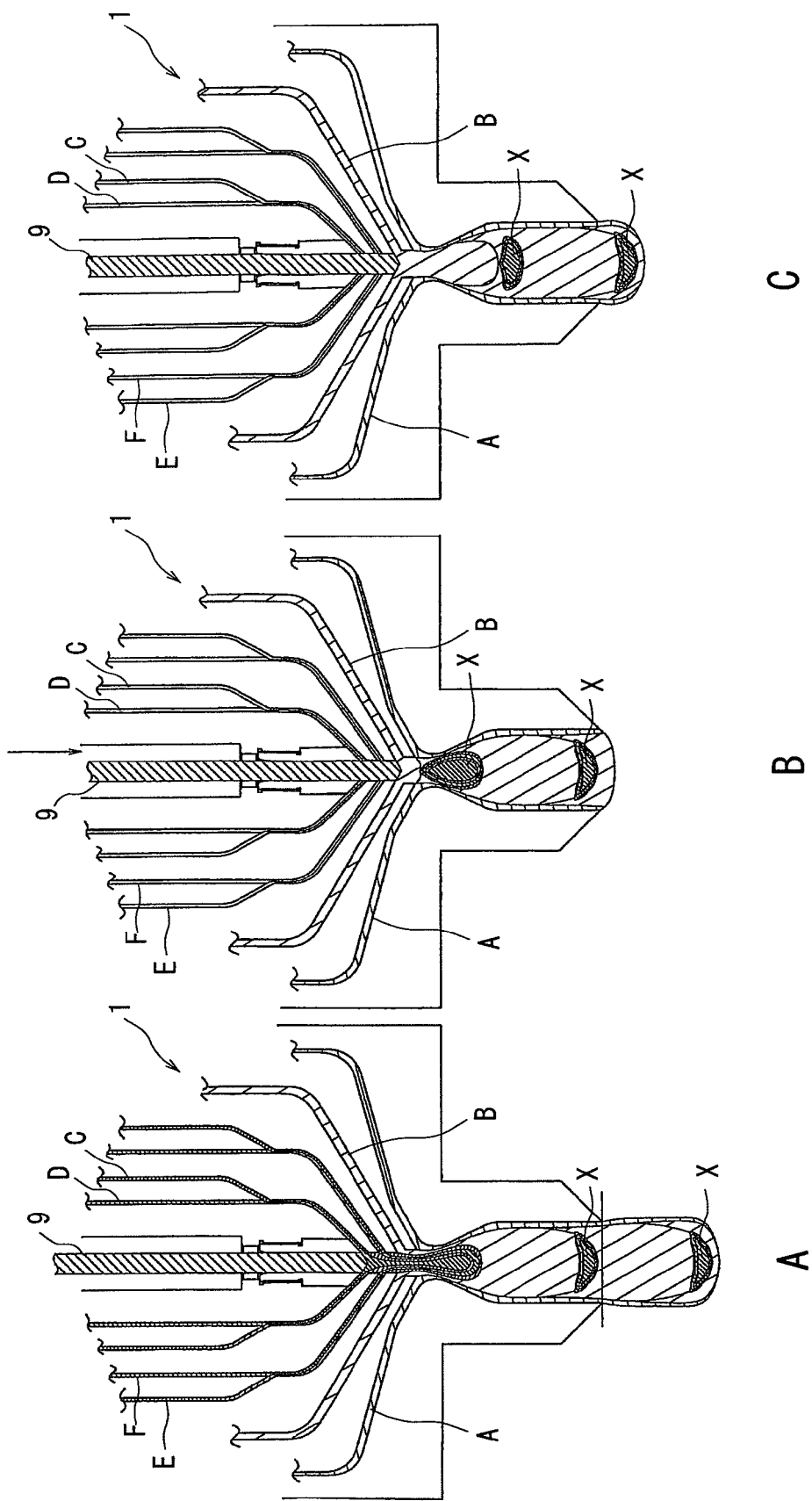

METHOD OF FEEDING COMPOSITE MOLTEN RESIN AND APPARATUS FOR FEEDING THE SAME

TECHNICAL FIELD

The present invention relates to a method of feeding a composite molten resin for forming a composite molten resin material comprising a molten resin layer and at least one inner molten resin layer wrapped in the molten resin layer, and to an apparatus for feeding the same.

BACKGROUND ART

Synthetic resin materials have been used for forming preformed bodies (usually called preforms) that are formed into beverage containers through hollow forming, and for forming container lids and container bodies such as cups. As is well known among people skilled in the art, a composite resin material is often used comprising outer molten resins and at least one inner molten resin layer wrapped in the outer molten resin layers. As the outer molten resin, in many cases, a synthetic resin having excellent mechanical properties and sanitary properties is selected and as the inner molten resin, a synthetic resin having excellent gas-barrier property is selected.

WO2004/065101 discloses an apparatus for feeding a composite molten resin comprising an outermost flow path through which a main layer-forming molten resin flows for forming a main layer of a preform, an outer flow path having an outer discharge port opened in the outermost flow path and through which a sub-layer-forming molten resin flows for forming a sub-layer of the preform, and an inner flow path having an inner discharge port opened in the outer flow path and through which a core-forming molten resin flows for forming a core.

The inner discharge port is provided with opening/closing means for selectively opening and closing the inner discharge port and with intermittent means for intermittently disposing the sub-layer-forming molten resin at the outer discharge port. As the inner discharge port is opened and closed by the opening/closing means of the apparatus for feeding the molten resin, the core layer-forming molten resin flows intermittently into the outermost flow path from the inner flow path through the outer flow path. The core layer-forming molten resin is pressed and deformed by the sub-layer-forming molten resin as the core layer-forming molten resin flows into the inside of the outermost flow path.

JP-B-6-49318 discloses an apparatus for forming a composite molten resin comprising an outer flow path through which a main layer-forming molten resin flows for forming a main layer of a preform, an inner flow path having an inner discharge port opened in the outer flow path and through which a shell layer-forming molten resin flows for forming a shell layer of the preform, and an innermost flow path having an innermost discharge port opened in the inner flow path and through which a core-forming molten resin flows for forming a core layer of the preform.

The innermost discharge port is provided with opening/closing means for selectively opening and closing the innermost discharge port. As the innermost discharge port is opened and closed by the opening/closing means, the shell layer-forming molten resin is fed into the outer molten resin so as to cover the core layer-forming molten resin like a shell.

Usually, the main layer and the sub-layer which use the same material can be regarded to forming one layer. The preform formed by the technology of WO2004/065101 is of a three-layer structure of main layer—core layer—main layer (for details, refer to its Examples). Since the core layer having a functional property is made of a material different from that of the main layer, the preforms had so far been limited to those of the two-kind-three-layer structure.

According to the technology of JP-B-6-49318, the shell layer-forming molten resin that is covering the core layer-forming molten resin like a shell, is fed into the inside of the main layer-forming molten resin that continuously flows through the outer flow path. Therefore, the preform that is formed is of a five-layer structure of main layer—shell layer—core layer—shell layer—main layer. The preform of a three-kind-five layer structure can be formed if the materials of the main layer, shell layer and core layer are changed. Though the technology of JP-B-6-49318 deals with a multi-kind-multi-layer structure, the core layer and the shell layer of a spherical shape requires a cumbersome operation for controlling the layer distribution of the multi-layer compression formed articles. Besides, difficulty is involved in wrapping the core layer with the shell layers.

The present invention was accomplished in view of the above circumstances, and its object is to provide a method of feeding a composite molten resin capable of easily forming a multi-kind-multi-layer preform and an apparatus therefor.

DISCLOSURE OF THE INVENTION

In order to achieve the above object, a method of feeding a composite molten resin of the invention comprises the steps of:

forming a shell body in which a core layer-forming molten resin is wrapped with a shell layer-forming molten resin by opening and closing a discharge portion of a conflux layer of the core layer-forming molten resin flowing on the innermost side of a plurality of annular flow paths and the shell layer-forming molten resin flowing on the outer side of the core layer-forming molten resin;

pressing and deforming the shell body with the sub-layer-forming molten resin by intermittently discharging the sub-layer-forming molten resin that flows on the outer side of the shell layer-forming molten resin; and cutting a composite molten resin including the pressed and deformed shell body in a unit of the shell body, and feeding the shell body to a next step.

In the method of feeding the composite molten resin, the discharge portion of the conflux layer of the core layer-forming molten resin and the shell layer-forming molten resin, is opened and closed by using a valve body.

In the method of feeding the composite molten resin, a main layer-forming molten resin is continuously flown through the annular flow path provided on the outer side of the sub-layer-forming molten resin, and a composite molten resin obtained by further wrapping the above composite molten resin with the main layer-forming molten resin is cut in a unit of the shell body.

The invention further provides an apparatus for feeding a composite molten resin having a nozzle portion which includes:

an outer discharge port in which an outermost annular flow path through which a main layer-forming molten resin flows, meets an outer annular flow path through which a sub-layer-forming molten resin flows inside of the outermost annular flow path; and an inner discharge port in which an inner annular flow path through which a shell layer-forming molten resin flows inside of the outer annular flow path, meets the innermost annular flow path through which a core layer-forming molten resin flows further inside of the inner annular flow path;

the outer discharge port and the inner discharge port being arranged in this order from the downstream toward the upstream in a direction in which the molten resins flow;

wherein provision is made of feeding means for continuously flowing the main layer, opening/closing means for opening and closing the inner discharge port, and intermittent discharging means for intermittently discharging the sub-layer-forming molten resin; and a shell body is formed by the opening/closing means by using the core layer-forming molten resin and the shell layer-forming molten resin in a manner that the core layer-forming molten resin is wrapped in the shell layer-forming molten resin, and after the shell body has passed through the outer discharge port, the sub-layer-forming molten resin presses and deforms the shell body.

In the apparatus for feeding the composite molten resin, an inner conflux path is formed in which the inner annular flow path through which the shell layer-forming molten resin flows meets the innermost annular flow path through which the core layer-forming molten resin flows to thereby forma conflux layer of these molten resins, and the conflux layer is flown into the outer discharge port.

In the apparatus for feeding the composite molten resin, the opening/closing means is disposed on the axis of the annular flow paths so as to move back and forth in the axial direction, and works as a valve body forming a valve at the distal end thereof to close the inner discharge port.

In the apparatus for feeding the composite molten resin, one or more flow paths are provided between the inner flow path and the outer flow path to flow the shell layer-forming molten resin that wraps the shell body therein, and a discharge port for discharging the one or more shell layer-forming molten resins is disposed between the outer discharge port and the inner discharge port.

BRIEF DESCRIPTION OF THE DRAWINGS

FIG. 3 illustrates the steps of forming a shell body of a molten resin in the nozzle body, wherein FIG. 3A is a sectional view of a state where a molten resin is extruded like a raindrop from a discharge port of the outermost flow path (and where the molten resin is discharged from the distal end of the nozzle and is cut), FIG. 3B is a sectional view of a state where the shell body of the shape of a raindrop is cut from the inner conflux path, and FIG. 3C is a sectional view of a state where the shell body is pressed and deformed flat;

FIG. 8 illustrates the steps of forming the shell body of the molten resin in the nozzle body, wherein FIG. 8A is a sectional view of a state where the molten resin is extruded like a raindrop from a discharge port of the outermost flow path (and where the molten resin is discharged from the distal end of the nozzle and is cut), FIG. 8B is a sectional view of a state where the shell body of the shape of a raindrop is cut from the inner conflux path, and FIG. 8C is a sectional view of a state where the shell body is pressed and deformed flat.

BEST MODE FOR CARRYING OUT THE INVENTION

A method of feeding a composite molten resin and an apparatus for feeding the same according to embodiments of the invention will now be described with reference to the drawings.

Figure 1:
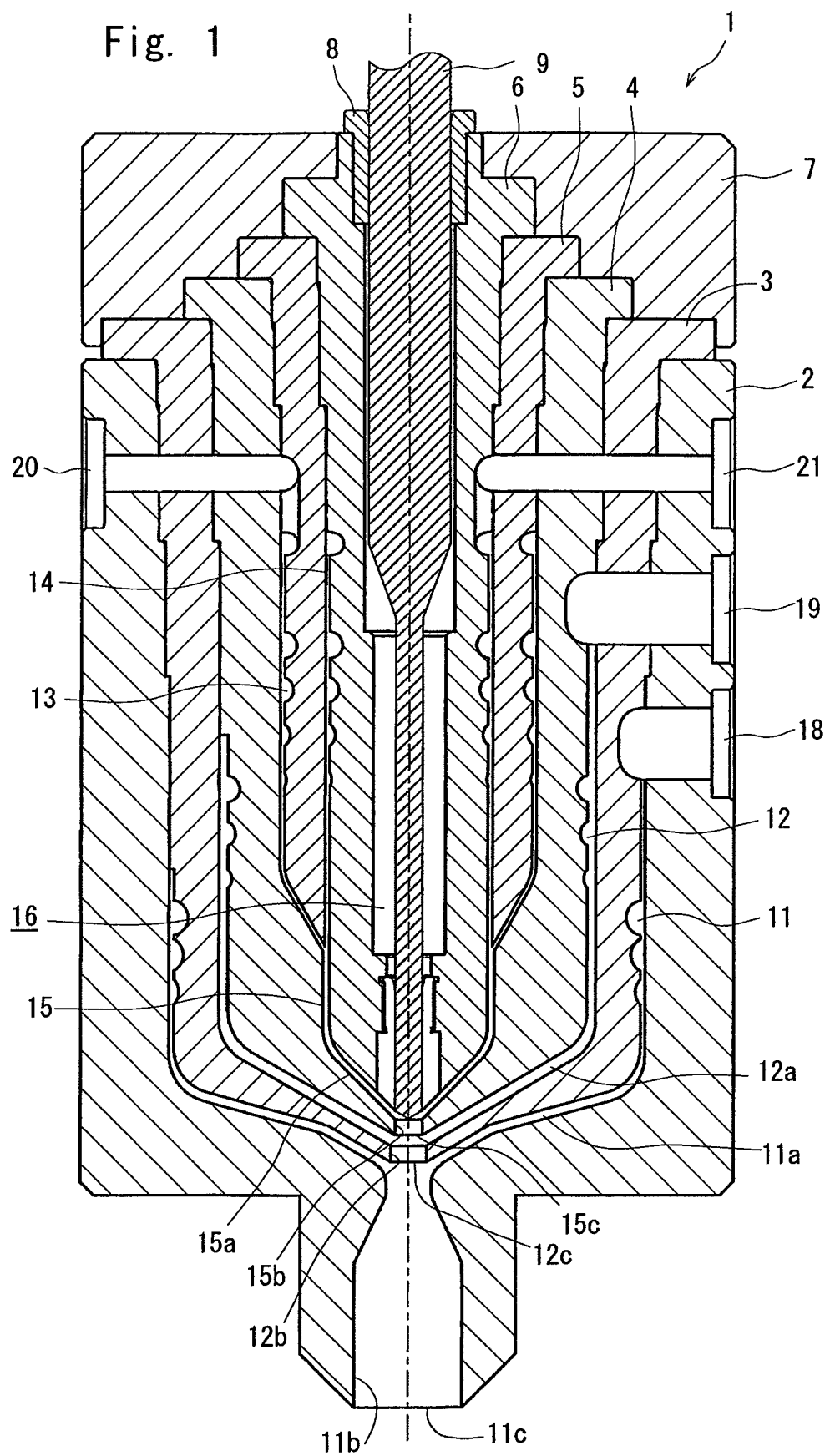
FIG. 1 is a sectional view of a nozzle body provided for an apparatus for feeding a composite molten resin according to a first embodiment of the present invention.

FIG. 1 illustrates a nozzle body of an apparatus for feeding a composite molten resin according to the present invention.

The nozzle body 1 is constituted by a plurality of cylindrical blocks, i.e., the outermost block 2, the innermost block 6, and intermediate blocks 3 to 5 disposed in order of from the outer side toward the inner side between these blocks 2 and 6. The intermediate blocks 3 to 5 and the innermost block 6 are so disposed as to be fitted to the inner peripheral portions of the blocks positioned on the outer sides. A lid-like upper block 7 is fitted onto the upper portions of the blocks 3 to 6.

A hollow portion 16 extending up and down is formed in the innermost block 6, and a shaft-like opening/closing valve 9 is disposed in the follow portion 16 so as to slide therein in the axial direction. A bearing 8 is disposed at an upper part of the innermost block 6 to support the slide valve 9 so as to slide up and down.

The outermost flow path 11 is formed between the inner peripheral surface of the outermost block 2 and the outer peripheral surface of the intermediate block 3, the outermost flow path 11 being provided with a main layer feed port 18 to where a main layer-forming molten resin will be fed with pressure. An outer flow path 12 is formed between the intermediate blocks 3 and 4, the outer flow path 12 being provided with a sub-layer feed port 19 to where a sub-layer-forming molten resin will be fed with pressure. An inner flow path 13 is formed between the intermediate blocks 4 and 5, the inner flow path 13 being provided with a shell-layer feed port 20 to where a shell layer-forming molten resin will be fed with pressure. The innermost flow path 14 is formed between the intermediate block 5 and the innermost block 6, the innermost flow path 14 being provided with a core layer feed port 21 to where a core layer-forming molten resin will be fed with pressure.

Figure 2:
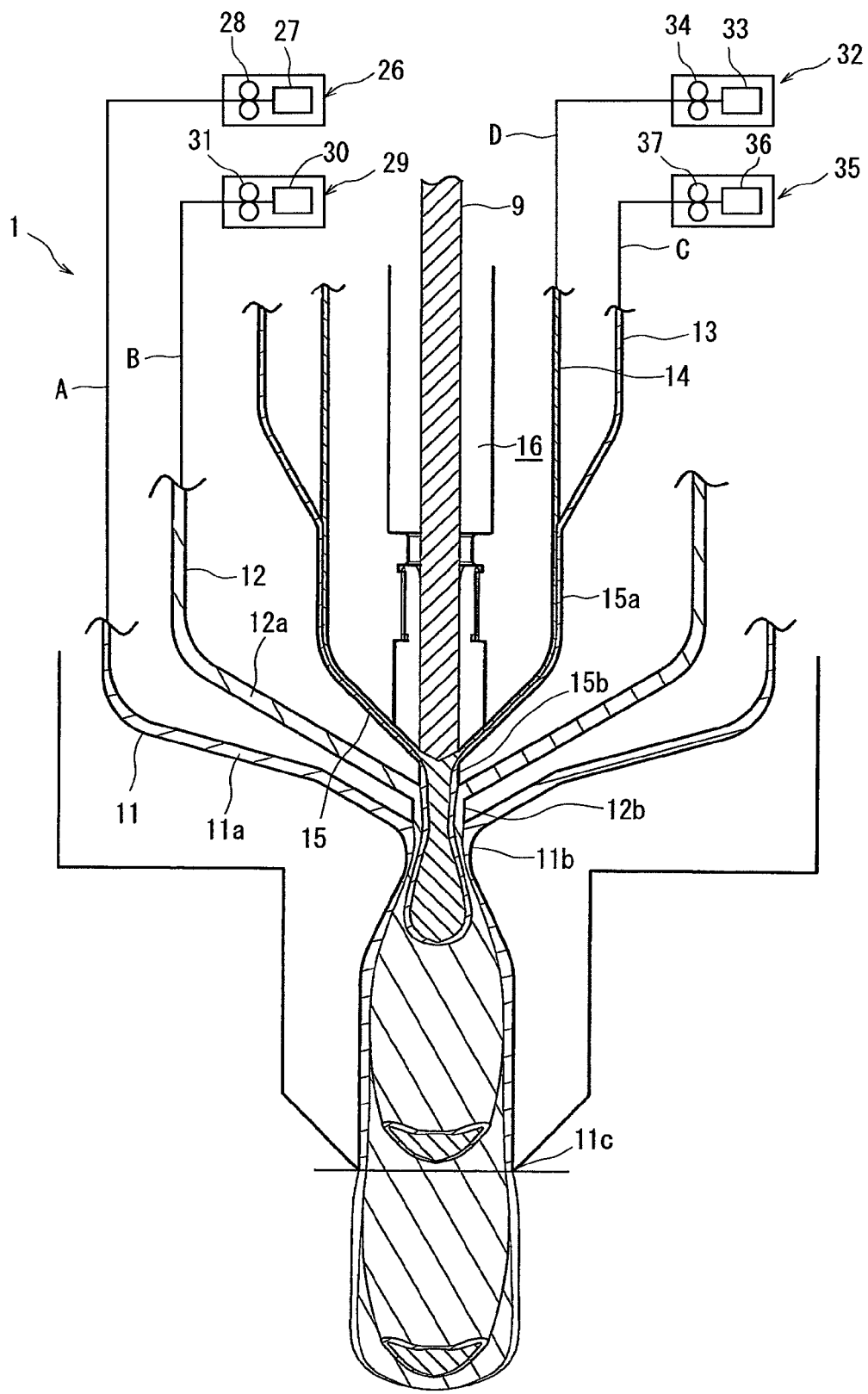
FIG. 2 is an enlarged sectional view of a distal end of a nozzle in the nozzle body of FIG. 1 (nozzle is not hatched on the block side but the molten resins are hatched, the same holds in FIGS. 3, 7 and 8 below)

Referring to FIG. 2, the outermost flow path 11 includes an introduction portion 11a of an annular shape in transverse cross section and a discharge portion 11b of a circular shape in transverse cross section. The downstream portion of the introduction portion 11a extends toward the downstream being gradually tilted inward in the radial direction, and the downstream end of the introduction portion 11a is connected to a peripheral edge at the upstream end of the discharge portion 11b. A discharge nozzle 11c is formed at the downstream end of the discharge portion 11b. The outer flow path 12, too, includes an introduction portion 12a of an annular shape in transverse cross section and a discharge portion 12b of a circular shape in transverse cross section. The downstream portion of the introduction portion 12a extends toward the downstream being gradually tilted inward in the radial direction, and the downstream end of the introduction portion 12a is connected to a peripheral edge at the upstream end of the discharge portion 12b.

The discharge portion 12b is relatively short, and an outer discharge port 12c is formed at the downstream end thereof, the outer discharge port 12c being opened in the central portion at the upstream end of the discharge portion 11b of the outermost flow path 11.

The inner flow path 13 is of an annular shape in transverse cross section, and the innermost flow path 14 flowing further inside thereof, too, has an annular shape in transverse cross section. These flow paths 13 and 14 form an inner conflux path 15 meeting together on the downstream side. The inner conflux path 15 includes an introduction portion 15a of an annular shape in transverse cross section and a discharge portion 15b of a circular shape in transverse cross section. The downstream portion of the introduction portion 15a extends toward the downstream being tilted inward in the radial direction, and the downstream end of the introduction portion 15a is connected to a discharge portion 15b. The discharge portion 15b is relatively short, and an inner discharge port 15c is formed at the downstream end thereof, the inner discharge port 15c being opened at the upstream end in the discharge portion 12b of the outer flow path 12.

Referring to FIG. 2, the main layer feed port 18 (see FIG. 1) of the outermost flow path 11 is connected to outermost molten resin feeding means 26. The outermost molten resin feeding means 26 includes an extruder 26 and a gear pump 28 connected on the downstream thereof. The outermost molten resin A extruded from the extruder 27 is fed, via the gear pump 28, to the outermost flow path 11. The sub-layer feed port 19 (see FIG. 1) of the outer flow path 12 is connected to the outer molten resin feeding means 29.

The outer molten resin feeding means 29 includes an extruder 30 and a gear pump 31 connected on the downstream thereof. The outer molten resin B extruded from the extruder 30 is fed, via the gear pump 31, to the outer flow path 12.

The outermost molten resin A and the outer molten resin B may be the same one, such as a polyester and, particularly, a polyethylene terephthalate.

The shell layer feed port 20 (see FIG. 1) of the inner flow path 13 is connected to inner molten resin feeding means 35. The inner molten resin feeding means 35 includes an extruder 36 and a gear pump 37 connected on the downstream thereof. The inner molten resin C extruded from the extruder 36 is fed, via the gear pump 37, to the inner flow path 13.

The core layer feed port 21 (see FIG. 1) of the innermost flow path 14 is connected to innermost molten resin feed means 32. The innermost molten resin feed means 32 includes an extruder 33 and a gear pump 34 connected on the downstream thereof. The innermost molten resin D extruded from the extruder 33 is fed, via the gear pump 34, to the innermost flow path 14.

Referring to FIG. 1, the apparatus constituted according to the present invention has opening/closing means for selectively opening and closing the inner discharge port 15c disposed at the downstream end of the inner conflux path 15. The opening/closing means includes the shaft-like opening/closing valve 9. The distal of the shaft-like opening/closing valve 9 has an outer diameter which is substantially the same as the inner diameter of the discharge portion 15b of the inner conflux path 15, and the distal end has a conical shape. The shaft-like opening/closing valve 9 can be constituted by a cam mechanism or a hydraulic pressure cylinder mechanism that is not shown. The shaft-like opening/closing valve can be brought to a selected position, i.e., can be moved forward in the axial direction to close the inner discharge port 15c and can be moved back to open the inner discharge port 15c. When the shaft-like opening/closing valve 9 is at the opening position, the inner discharge port 15c is opened at the downstream end of the inner conflux path 15, and the inner conflux path 15 is communicated with the outer flow path 12. When the shaft-like opening/closing valve 9 is at the closing position, the inner discharge port 15c is closed at the downstream end of the inner conflux path 15, and the inner conflux path 15 is shut off from the outer flow path 12.

In the apparatus for feeding the composite molten resin as shown in FIG. 2, the outermost molten resin feeding means 26 is preferably operated continuously (extruder 27 is continuously operated and the gear pump 28, too, is continuously operated), and the outermost molten resin A is continuously fed to the outermost flow path 11. It is desired that the inner molten resin feeding means 35 and the innermost molten resin feeding means 32, too, are continuously operated (extruders 33 and 36 are continuously operated, and the gear pumps 34 and 37, too, are continuously operated). Here, the shaft-like opening/closing valve 9 disposed in the inner conflux path 15 must be alternately brought to the opening position and the closing position.

The inner molten resin C flowing through the inner flow path 13 and the innermost molten resin D flowing through the innermost flow path 14 meet together in the inner conflux path 15, the inner molten resin C flowing on the outer side in the annular flow path annularly wrapping the innermost molten resin D flowing on the inside; i.e., the resins flow in the form of an annular two layers through the inner conflux path 15.

When the shaft-like opening/closing valve 9 is at the opening position, the inner and innermost molten resins C and D fed to the inner conflux path 15 flow into the discharge portion 11b of the outermost flow path 11 via the discharge portion 12b of the outer flow path 12. When the shaft-like opening/closing valve 9 is at the closing position, the inner discharge port 15c of the inner conflux path 15 is closed, and the inner and innermost molten resins C and D do not flow into the discharge portion 12b of the outer flow path 12.

On the other hand, the outer molten resin feeding means 29 must be intermittently operated depending upon the opening/closing of the shaft-like opening/closing valve 9 (the extruder 30 is continuously operated but the gear pump 31 is intermittently operated). Desirably, the outer molten resin feeding means 29 starts operating just as, or before, the shaft-like opening/closing valve 9 is brought to the closing position and the inner discharge port 15c is closed, and operates just as, or before, the shaft-like opening/closing valve 9 is brought to the opening position and the inner discharge port 15c is opened. It is desired that the time in which the shaft-like opening/closing valve 9 is at the closing position and the inner discharge port 15c remains closed is about 1 to 4 times as long as the time in which the shaft-like opening/closing valve 9 is at the opening position and the inner discharge port 15c remains opened.

Figure 3:
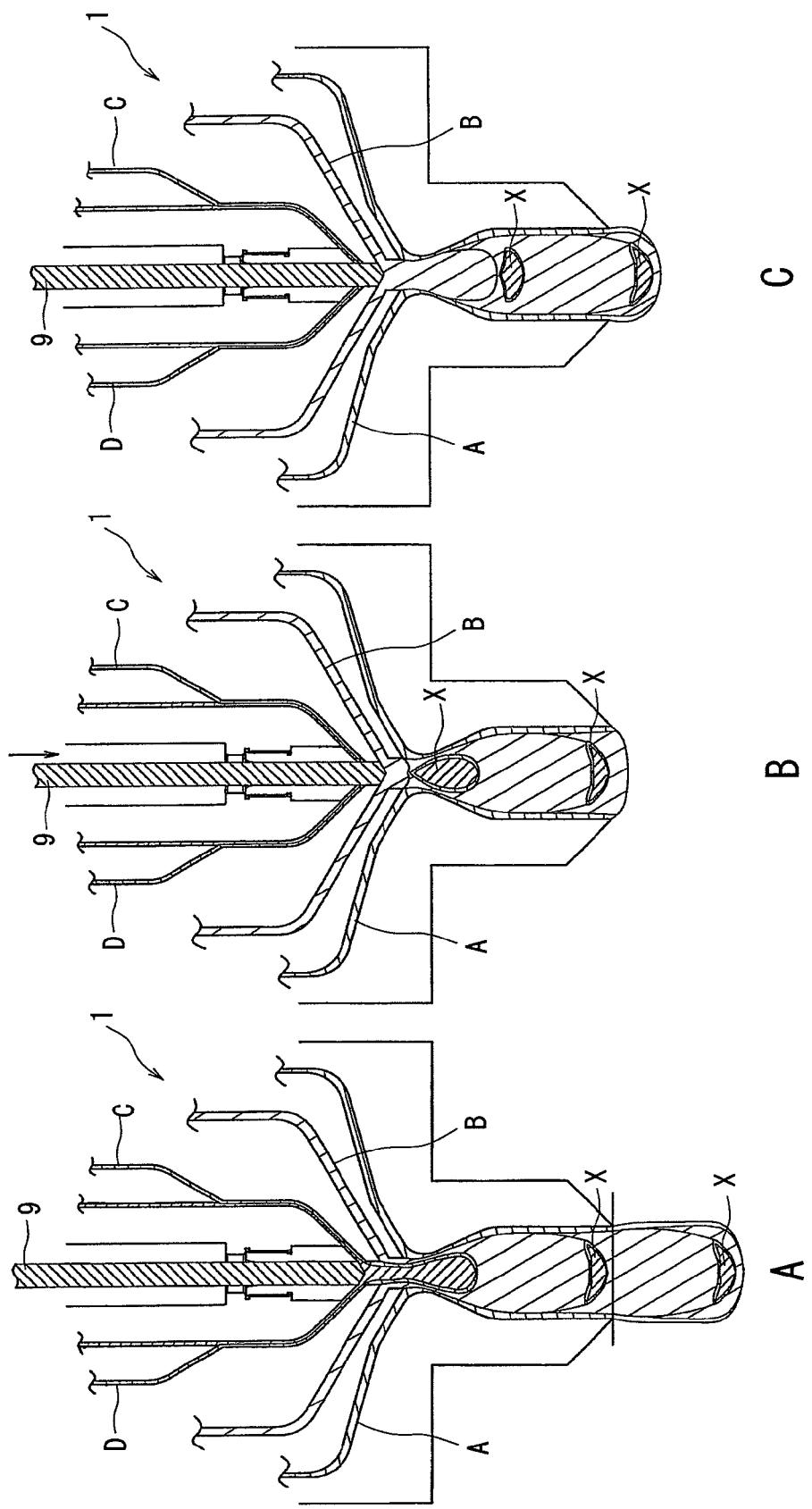

Concretely, after the discharge port 15c is closed by the shaft-like opening/closing valve 9 as shown in FIG. 3C, the shaft-like opening/closing valve 9 moves back upward to open the valve as shown in FIG. 3A. In this state, the inner molten resin C serves as an outer layer for the innermost molten resin D, and the downstream side of the introduction portion 15a extends inward in the radial direction being tilted downward. Since the distal end of the shaft-like opening/closing valve 9 is of a conical shape, the inner molten resin C flows to the bottom of the innermost molten resin D so as to wrap the innermost molten resin D therein. The outer molten resin B, on the other hand, has not been fed, and the innermost molten resin D covered with the inner molten resin C assumes the shape of a raindrop to form a shell body X wrapping the innermost molten resin therein. Thereafter, the shell body X flows from the inner conflux path 15 into the discharge portion 11b of the outermost flow path 11 via the discharge portion 12b of the outer flow path 12. The shell body X of the shape of a raindrop is fed onto the outer molten resin B that has been fed before its feed is interrupted.

Referring to FIG. 3B, the outer molten resin B is fed again through the outer flow path 12 from its state of not being fed just as, or before, the shaft-like opening/closing valve 9 moves down or forward to close the inner discharge port 15c. Then, the outer molten resin B flows into the discharge portion 12b while pressing the shell body X in the form of a raindrop, and the shell body X in the shape of a raindrop spreads sideways to become flat as shown in FIG. 3C. Near the opening of the discharge portion 12b, the shell body X protrudes downward at the center to assume a nearly crescent shape. As described above, the outermost molten resin A of the outermost flow path 11 is continuously discharged at the peripheral edge of the discharge portion 11b, and the outer molten resin B and the shell body X flow into the outermost molten resin A.

The above operations constitute a cycle which is repeated many times. As the shell body X is fed up to just short of the opening of the discharge portion 11b in every cycle, the molten resin is cut by cutting means (not shown) formed last time. The molten resin is fed a compression-forming machine of a next step through conveyer means.

The compression-forming machine compression-forms the molten resin into a preform. Namely, as shown in a circle of an arrow A in FIG. 4, a multi-layer synthetic resin is formed for forming the preform including a main layer/sub-layer 50, a shell layer 51, a core layer 52, a shell layer 51 and a sub-layer/main layer 50 in this order from the inside toward the outside of the peripheral wall of the preform. If the outermost molten resin A and the outer molten resin B are of the same molten resin, and the inner resin C and the innermost resin D are of different functional resins, then a three-kind-five-layer preform can be formed.

In this embodiment as described above, the core resin wrapped in the shell resin layers is deformed into a suitable shape for compression forming, and a multi-layer molten resin mass is compression-formed to obtain a multi-layer formed article having five or more layers.

The functional resins such as the gas-barrier layer and the adhesive layer are relatively expensive and exhibit their functions to a sufficient degree even if their thicknesses are small. It is, therefore, desired to decrease their thicknesses. Upon wrapping the core layer in the shell resin layers as in this embodiment, therefore, the intermediate layers (functional resins such as shell layers, core layer, etc.) may be formed in small thicknesses.

Referring to FIG. 2, further, the discharge nozzle 11c, the outer discharge port 12c and the inner discharge port 15c are arranged in this order from the downstream toward the upstream. Therefore, the discharge ports are not concentrated at one place, and a multi-layer structure can be accomplished without causing the discharge ports at the center of the nozzle body 1 to become complex.

Figure 4:
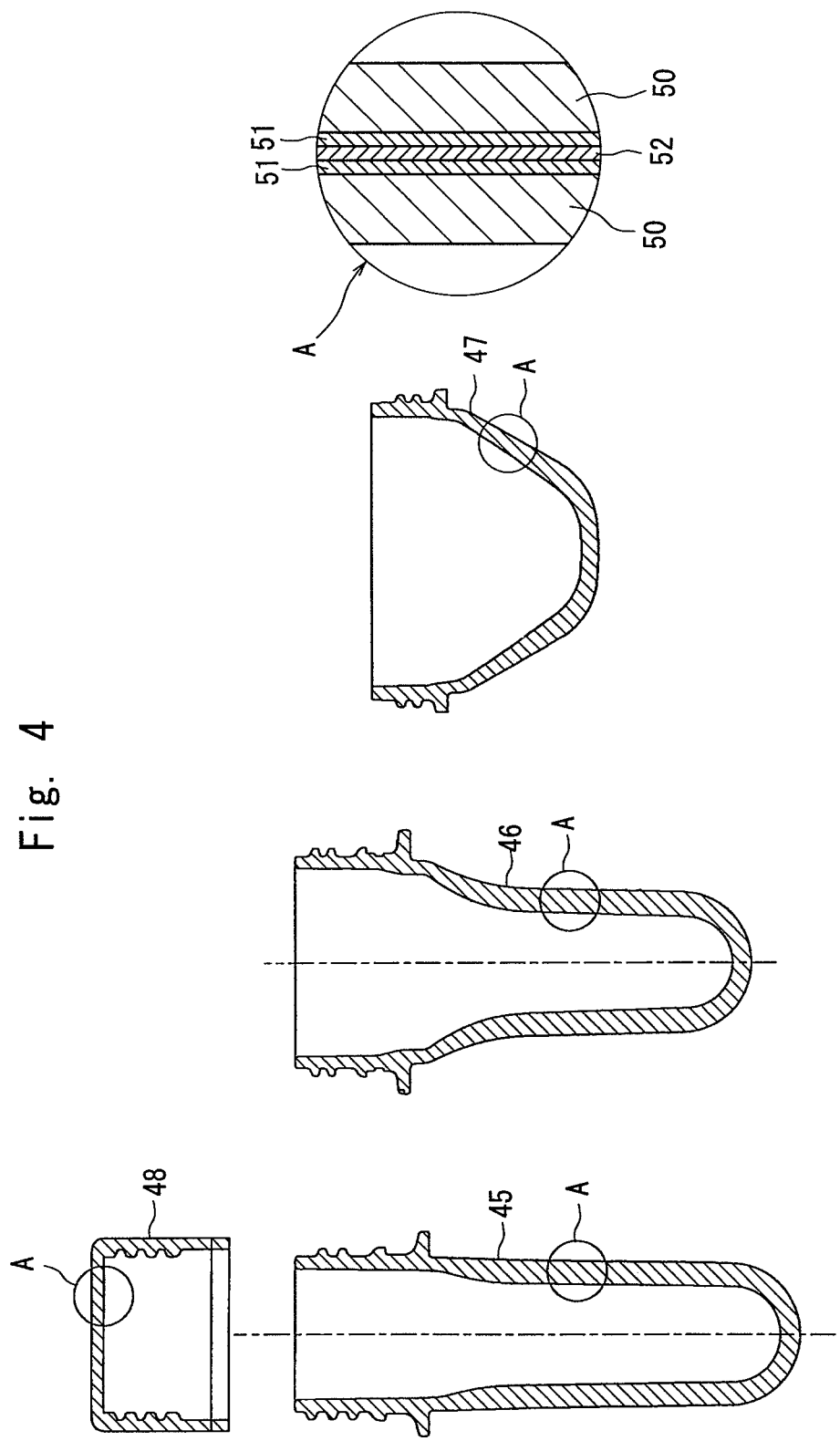
FIG. 4 is a sectional view of various preforms after the molten resin formed according to the first embodiment is compression-formed, inclusive of an enlarged sectional view of peripheral wall portions of various preforms.
Figure 5:
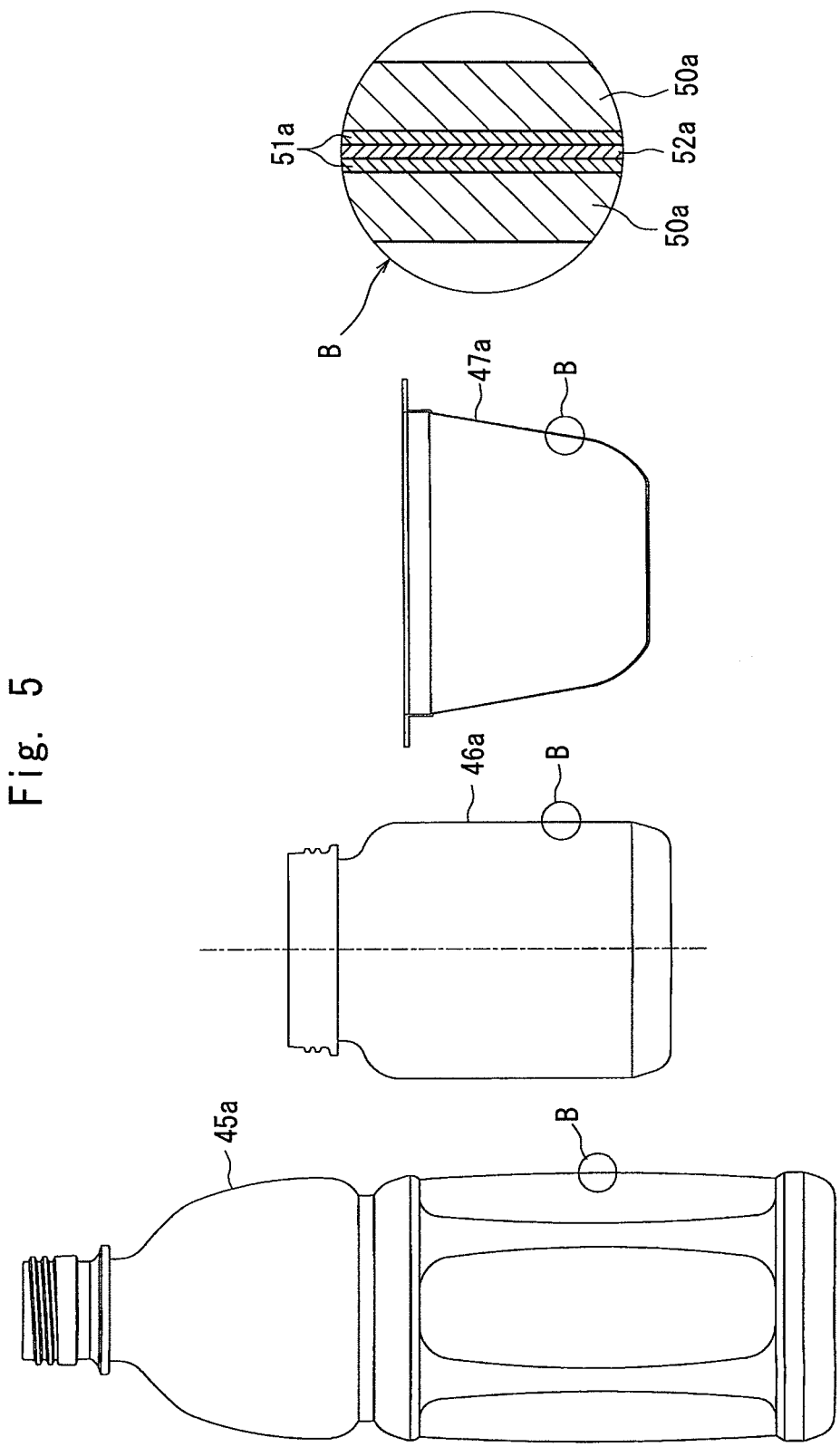
FIG. 5 is a sectional view of various containers obtained from various preforms of FIG. 4 through blow-forming, inclusive of an enlarged sectional view of peripheral wall portions of various containers.

As shown in FIG. 4, the preforms are used as primarily formed articles like a bottle 45, a jar 46, a cup 47 and a cap 48. As shown in FIG. 5, the preforms are further blow-formed into secondarily formed articles like a bottle body 45a, a jar body 46a and a cup body 47a. As shown in a circle of an arrow B in FIG. 5, the peripheral walls of these containers are formed by overlapping a main layer/sub-layer 50a, a shell layer 51a, a core layer 52a, a shell layer 51a and a sub-layer/main layer 50a in this order from the inside toward the outside of the peripheral wall of the container.

The outermost molten resin (main layer) A flowing on the outermost side of this embodiment may not often be used depending upon the materials (viscosities) and amounts (flow rates) of the molten resins B to D. In that case, the main layer is omitted, and secondarily formed articles are obtained having the sub-layer 50a, shell layer 51a, core layer 52a, shell layer 51a and sub-layer 50a that are overlapped.

Next, the method of feeding the composite molten resin and the apparatus for feeding the same according to a second embodiment of the invention will be described. Here, the same portions as those of the above first embodiment are denoted by the same reference numerals but are not described here again in detail.

The above first embodiment has formed the three-kind-five-layer preform, while this embodiment is concerned to the method of forming a five-kind-nine-layer preform.

Figure 6:
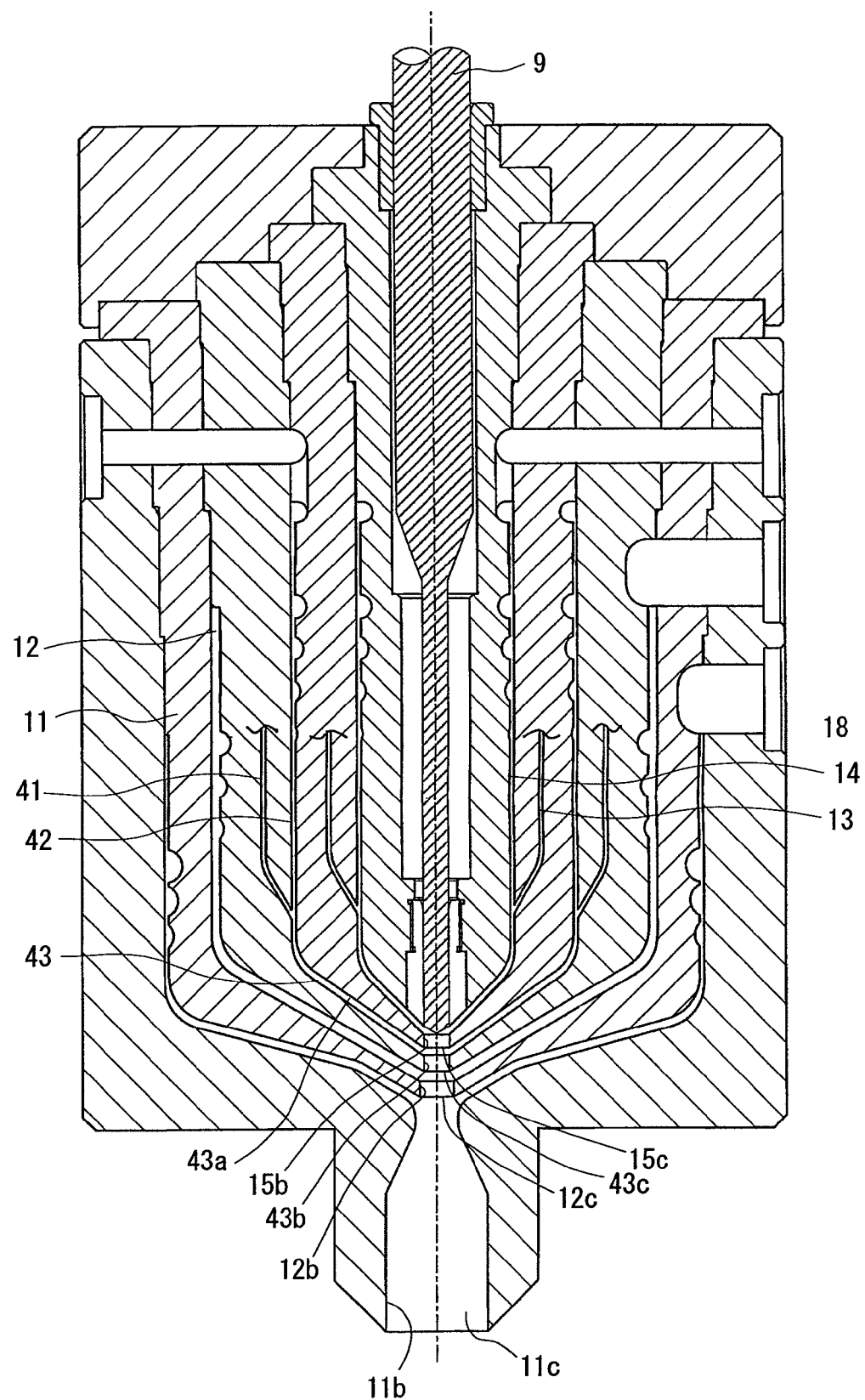
FIG. 6 is a sectional view of the nozzle body provided for the apparatus for feeding the composite molten resin according to a second embodiment of the present invention.
Figure 7:
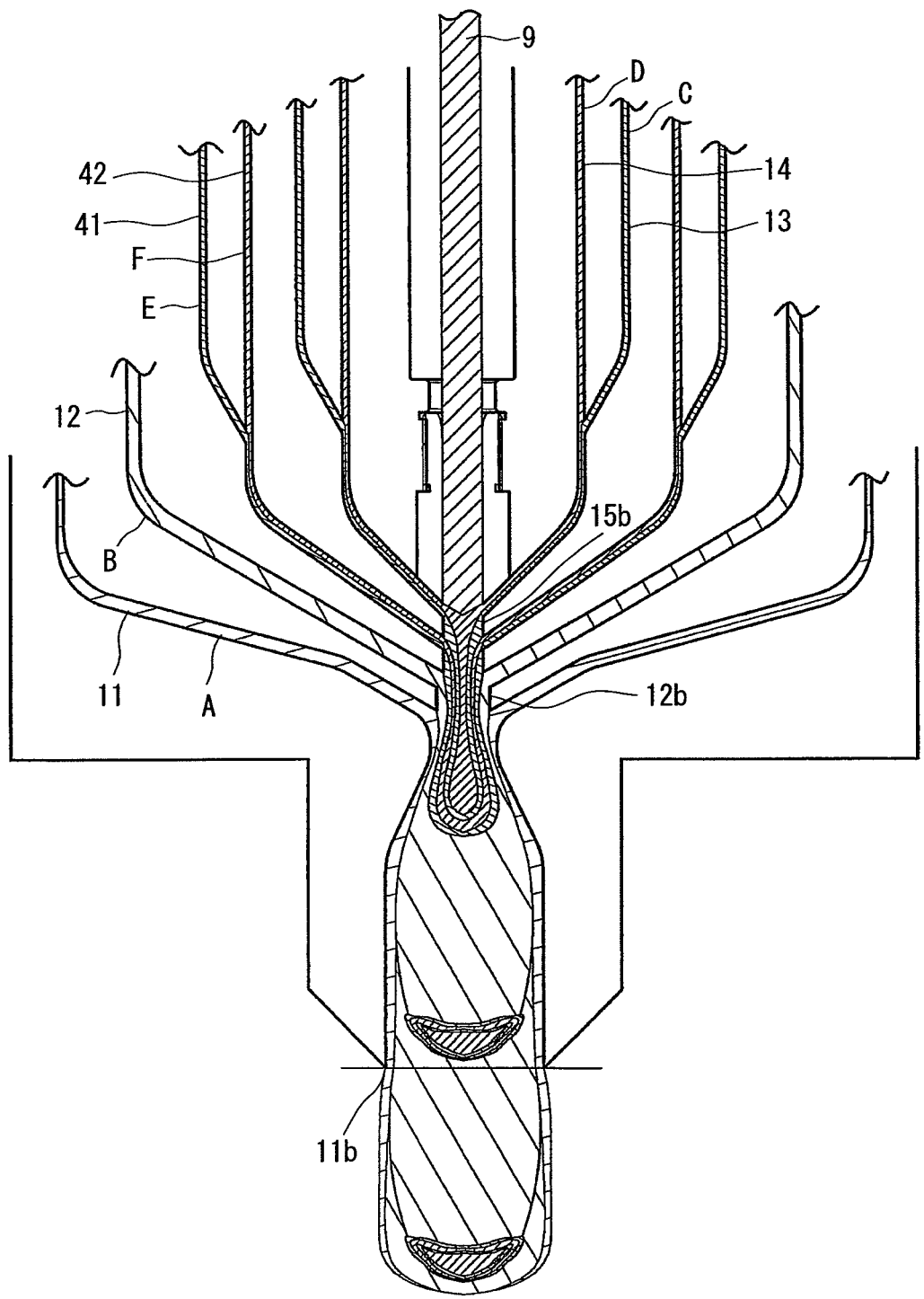
FIG. 7 is an enlarged sectional view of a distal end of the nozzle in the nozzle body of FIG. 6.

Referring to FIG. 6, between the outer flow path 12 and the inner flow path 13, there are formed an outer intermediate flow path 41 arranged on the outer side and an inner intermediate flow path 42 arranged on the inner side. These intermediate flow paths 41 and 42 meet together in an intermediate conflux path 43 on the downstream thereof. Referring to FIG. 7, an outer intermediate molten resin E flowing on the outer side surrounds and annularly wraps the inner intermediate molten resin F flowing on the inner side, and this annular two-layer stream flows through the intermediate conflux path 43.

The intermediate conflux path 43 includes an introduction portion 43a of an annular shape in transverse cross section and a discharge portion 43b of a circular shape in transverse cross section. The downstream portion of the introduction portion 43a extends toward the downstream being gradually tilted inward in the radial direction, and the downstream end of the introduction portion 43a is connected to a discharge portion 43b. The discharge portion 43b is relatively short and has an inner discharge port 43c formed at the downstream end thereof. The discharge port 43c is opened at an upstream end in the discharge portion 12b of the outer flow path 12.

Intermediate molten resin feeding means that are not shown are provided on the upstream of the outer intermediate flow path 41 and the inner intermediate flow path 42, and extruders and gear pumps (see FIG. 2) are arranged therein.

In this constitution, after the discharge ports 15c and 43c are closed by the shaft-like opening/closing valve 9 as shown in FIG. 8C, the shaft-like opening/closing valve 9 moves back upward to open the valve as shown in FIG. 8A. In this state, the inner molten resin C serves as an outer layer for the innermost molten resin D, and the downstream sides of the introduction portion 15a and 43a extend inward in the radial direction being tilted downward. Since the distal end of the shaft-like opening/closing valve 9 is of a conical shape, as shown in FIG. 8A, the outer intermediate molten resin E forming the outer layer in the intermediate conflux path 43 that is opened earlier than any other path flows to the bottom of the inner intermediate molten resin F. Next, the molten resins E and F flow together with the inner molten resin C to the bottom of the innermost molten resin D so as to wrap the innermost molten resin D with three layers. The outer molten resin B, on the other hand, has not been fed, and the molten resins C, E, F and the innermost molten resin D covered with these resins assume the shape of a raindrop, and flow from the inner conflux path 15 into the discharge portion 11b of the outermost flow path 11 via the discharge portion 12b of the outer flow path 12. The shell body X of the shape of a raindrop comprising the molten resins C to F is fed onto the outer molten resin B that has been fed before its feed is interrupted.

Referring to FIG. 8B, the shaft-like opening/closing valve 9 moves down or forward to close the inner discharge port 15c, and the outer molten resin B is fed again through the outer flow path 12 from its state of not being fed. Then, the outer molten resin B flows into the discharge portion 11b while pressing the shell body X. As shown in FIG. 8C, the shell body X in the shape of a raindrop gradually spreads sideways to become flat. Near the opening of the discharge portion 11b, the shell body X protrudes downward to assume a nearly crescent shape. As described above, the outer most molten resin A of the outermost flow path 11 is continuously discharged at the outer peripheral portion of the discharge portion 11b, and the outer molten resin B and the shell body X flow into the outermost molten resin A.

The above operations constitute a cycle which is repeated many times. As the shell body X is fed up to just short of the opening of the discharge portion 15b in every cycle, the molten resin is cut by cutting means (not shown) formed last time.

Thus, the molten resin is formed for forming the preform having an inner main layer, an inner sub-layer, a first inner shell layer, a second inner shell layer, a core layer, a second outer shell layer, a first shell layer, an outer sub-layer and an outer main layer which are overlapped from the inside toward the outside of the peripheral wall of the preform. If the outermost molten resin A and the outer molten resin B are of the same molten resin, and the inner resin C, the innermost resin D and intermediate resins E, F are of different functional resins, then a five-kind-nine-layer preform can be formed.

By wrapping the core layer with the shell resin layers, the intermediate layers (shell layers, core layer) are allowed to be formed in small thicknesses.

According to the present invention as described above, formed articles of five layers can be obtained by using three kinds of materials, and formed articles of nine layers can be obtained by using five kinds of materials. If the number of kinds of materials is n, then the number of layers can be expressed as 2n–1. Therefore, if the numbers of the core flow path and the shell flow paths are further divided to deal with 6 kinds, 7 kinds or more kinds of materials, the formed articles are obtained having 11 layers, 13 layers, - - - . By using many materials at one time, it is allowed to combine the materials having different properties at one time, and molded articles of high performance having various properties in combination can be obtained.

In this embodiment, too, the outermost molten resin (main layer) A flowing on the outermost side may not be used depending upon the materials (viscosities) and amounts (flow rates) of the molten resins B to F like in the above first embodiment.

The apparatus for feeding a composite molten resin of the invention has a nozzle portion which includes:

an outer discharge port in which an outermost annular flow path through which a main layer-forming molten resin flows, meets an outer annular flow path through which a sub-layer-forming molten resin flows inside of the outermost annular flow path; and an inner discharge port in which an inner annular flow path through which a shell layer-forming molten resin flows inside of the outer annular flow path, meets the innermost annular flow path through which a core layer-forming molten resin flows further inside of the inner annular flow path;

the outer discharge port and the inner discharge port being arranged in this order from the downstream toward the upstream in a direction in which the molten resins flow;

wherein provision is further made of feeding means for continuously flowing the main layer, opening/closing means for opening and closing the inner discharge port, and intermittent discharging means for intermittently discharging the sub-layer-forming molten resin; and a shell body is formed by the opening/closing means by using the core layer-forming molten resin and the shell layer-forming molten resin in a manner that the core layer-forming molten resin is wrapped in the shell layer-forming molten resin, and after the shell body has passed through the outer discharge port, the sub-layer-forming molten resin presses and deforms the shell body.

It is therefore allowed to form a preform having a shell layer, a core layer and a shell layer overlapped among the resin layers of main layers and sub-layers forming the peripheral wall of the preform and, therefore, to form a multi-kind-multi-layer (three-kind-five-layer) preform. Further, the outer discharge port and inner discharge port are arranged in this order from the downstream toward the upstream in a direction in which the molten resins flow. Therefore, the discharge ports are not concentrated at one place, and a multilayer structure can be accomplished without causing the discharge ports at the center of the nozzle portion to become complex.

In the apparatus for feeding a composite molten resin, an inner conflux path is formed and in which the inner annular flow path through which the shell layer-forming molten resin flows meets the innermost annular flow path through which the core layer-forming molten resin flows. Further, a conflux layer of these molten resins is flown to the outer discharge port making it possible to form a conflux layer of two layers, i.e., the shell layer and the core layer.

In the apparatus for feeding a composite molten resin, the opening/closing means is disposed on the axis of the annular flow paths to move back and forth in the axial direction, and works as a valve body forming a valve at the distal end thereof to close the inner discharge port. By opening and closing the valve, therefore, the shell body can be efficiently formed and can be efficiently pressed and deformed by the intermittent operation of the intermittent discharging means.

In the apparatus for feeding the composite molten resin, one or more flow paths are provided between the inner flow path and the outer flow path to flow the shell layer-forming molten resin that wraps the shell body therein, and a discharge port for discharging the one or more shell layer-forming molten resins is disposed between the outer discharge port and the inner discharge port. By adding, for example, a flow path of the shell layer-forming molten resin layer between the resin layers of the main layer and the sub-layer in the peripheral wall of the preform, therefore, it is allowed to form a four-kind-seven-layer preform having a second shell layer, a shell layer, a core layer, a shell layer and a second shell layer which are overlapped. By increasing the flow paths of the shell layer-forming molten resin, further, it is allowed to form a preform of more layers of more kinds (if the number of kinds of materials is n, the number of layers is 2n–1).

Though the invention was described above by way of embodiments, it should be noted that the present invention can be further modified or altered in various other ways without departing from the technical scope of the invention, as a matter of course.

The flow paths (outermost flow path 11, outer flow path 12, inner flow path 13, innermost flow path 14, inner conflux flow path, outer intermediate flow path 41, inner intermediate flow path 42, intermediate conflux path 43) of the nozzle body 1 may assume linear shapes or curved shapes. The widths of flow paths (gaps among the blocks) may be constant or may be broadened by forming a step in the flow paths. Further, the flow paths may be annularly formed in only the discharge port of the molten resin and may be formed in a spiral shape on the upstream side.

The outermost molten resin feeding means 26 is continuously operated to continuously feed the molten resin. As required, therefore, the gear pump 28 may be omitted. It is, however, desired to provide the gear pump 28 from the standpoint of uniformly and smoothly flowing the molten resin that is continuously fed.

As for the intermittent discharge means using gear pumps 28, 31, 34 and 37, there may be, further, suitably selected a method of alternately driving a plurality of plungers or a method of opening/closing the valve pins and the rotary valves in addition to using the gear pumps depending upon the kinds of materials, weight of the formed articles (weight of extrusion) and forming rate to favorably press and deform the shell body.

The invention claimed is:

1. A method of forming a composite molten resin using a nozzle body having a plurality of flow paths, the method comprising the steps of:

forming an inner annular two-layer conflux layer by allowing a core layer-forming molten resin flowing through an innermost annular flow path and a shell layer-forming molten resin flowing through an annular flow path spaced radially outward from the innermost annular flow path to meet in an inner annular conflux path, the inner conflux path initially spaced radially outward from a shaft-like opening/closing valve arranged centrally of the nozzle body and at an outlet of the inner conflux path;

allowing the inner conflux layer to flow through the inner conflux path toward the opening/closing valve so as to pass through an inner discharge port which is repeatedly opened and closed by the opening/closing valve and then to pass through an outer discharge port arranged downstream the inner discharge port;

intermittently feeding a sub-layer-forming molten resin through an annular flow path spaced radially outward from the flow path carrying the shell layer-forming molten resin, the opening/closing valve closing to initially form distinct raindrop-shaped shell body units of shell layer-forming molten resin encapsulating core layer-forming molten resin at the same time or after feed of the sub-layer-forming molten resin is switched on, wherein the intermittent feed of the sub-layer-forming molten resin flows through the outer discharge port and flattens each shell body unit having previously passed therethrough; and discharging a composite molten resin including each flattened shell body unit from a downstream discharge nozzle of the nozzle body and then cutting the composite molten resin to form a composite unit comprising a flattened shell body unit.

2. The method according to claim 1, further comprising forming an outer annular two-layer conflux layer by allowing an inner intermediate molten resin flowing through an inner intermediate annular flow path and an outer intermediate molten resin flowing through an outer intermediate flow path spaced radially outward from the inner intermediate flow path to meet in an intermediate conflux path, the outer conflux layer surrounding the inner conflux layer as both the inner and outer conflux layers flow through an intermediate discharge port arranged between the inner and outer discharge ports.

3. The method according to claim 2, wherein the intermediate conflux path is spaced radially inward from the flow path carrying the sub-layer-forming molten resin and is spaced radially outward from the inner conflux path.

4. The method according to claim 3, wherein the opening/closing valve repeatedly opens and closes both the inner and intermediate discharge ports so as to form each distinct raindrop-shaped shell body unit to comprise molten resin of the outer conflux layer encapsulating molten resin of the inner conflux layer.

5. The method according to claim 4, further comprising continuously flowing a main layer-forming molten resin through an annular flow path spaced radially outward from the flow path carrying the sub-layer-forming molten resin so as to wrap the sub-layer-forming molten and each shell body unit after their discharge from the outer discharge port.

6. The method according to claim 4, wherein each shell body unit is cut from the inner conflux path by said closing of the opening/closing valve.

7. The method according to claim 4, wherein each shell body unit passes through the outer discharge port at the same time or after feed of the sub-layer-forming molten resin is switched off.

8. The method according to claim 1, further comprising continuously flowing a main layer-forming molten resin through an annular flow path spaced radially outward from the flow path carrying the sub-layer-forming molten resin so as to wrap the sub-layer-forming molten and each shell body unit after their discharge from the outer discharge port.

9. The method according to claim 1, wherein each shell body unit is cut from the inner conflux path by said closing of the opening/closing valve.

10. The method according to claim 1, wherein each shell body unit passes through the outer discharge port at the same time or after feed of the sub-layer-forming molten resin is switched off.

* * * * *